(12) United States Patent
Sadhvani et al.

(10) Patent No.: US 10,171,394 B2
(45) Date of Patent: Jan. 1, 2019

(54) MULTIMEDIA MAIL SERVICE

(71) Applicant: Verizon Patent and Licensing Inc., Arlington, VA (US)

(72) Inventors: Rita Sadhvani, Watchung, NJ (US); Hannah Y. Moon, Boston, MA (US); Ning Zhang, Warren, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 351 days.

(21) Appl. No.: 14/711,063

(22) Filed: May 13, 2015

(65) Prior Publication Data
US 2016/0337283 A1 Nov. 17, 2016

(51) Int. Cl.
H04L 12/58 (2006.01)
G06F 3/0484 (2013.01)
G06F 3/0482 (2013.01)
H04M 19/04 (2006.01)

(52) U.S. Cl.
CPC ............ H04L 51/10 (2013.01); G06F 3/0482 (2013.01); G06F 3/04842 (2013.01); G06F 3/04847 (2013.01); H04M 19/04 (2013.01); H04M 2203/25 (2013.01)

(58) Field of Classification Search
CPC . H04L 51/10; G06F 3/04842; G06F 3/04847; G06F 3/0482; H04M 19/04; H04M 2203/25
See application file for complete search history.

(56) References Cited

U.S. PATENT DOCUMENTS

2002/0087549 A1* 7/2002 Mostafa .................. H04L 29/06
2003/0023691 A1* 1/2003 Knauerhase ............ H04L 51/04
 709/206
2007/0196806 A1* 8/2007 Ljungman ................ G09B 3/00
 434/350
2015/0304934 A1* 10/2015 Malatack .............. H04W 12/06
 455/552.1

* cited by examiner

Primary Examiner — June Y Sison
Assistant Examiner — Steven C Nguyen

(57) ABSTRACT

A system may determine to provide content in a multimedia content message to a user. The user may be associated with a recipient account that is associated with content type preferences that identify a plurality of permitted content types. Each content type, of the plurality of permitted content types, may identify a type of content that is permitted to be included in the multimedia content message. The system may obtain the content type preferences to determine the plurality of permitted content types. The system may determine one or more selected content types of the plurality of permitted content types. The one or more selected content types may be content types of content to be obtained by the system and included in the multimedia content message. The system may obtain content of the one or more selected content types. The system may provide the multimedia content message including the content.

20 Claims, 17 Drawing Sheets

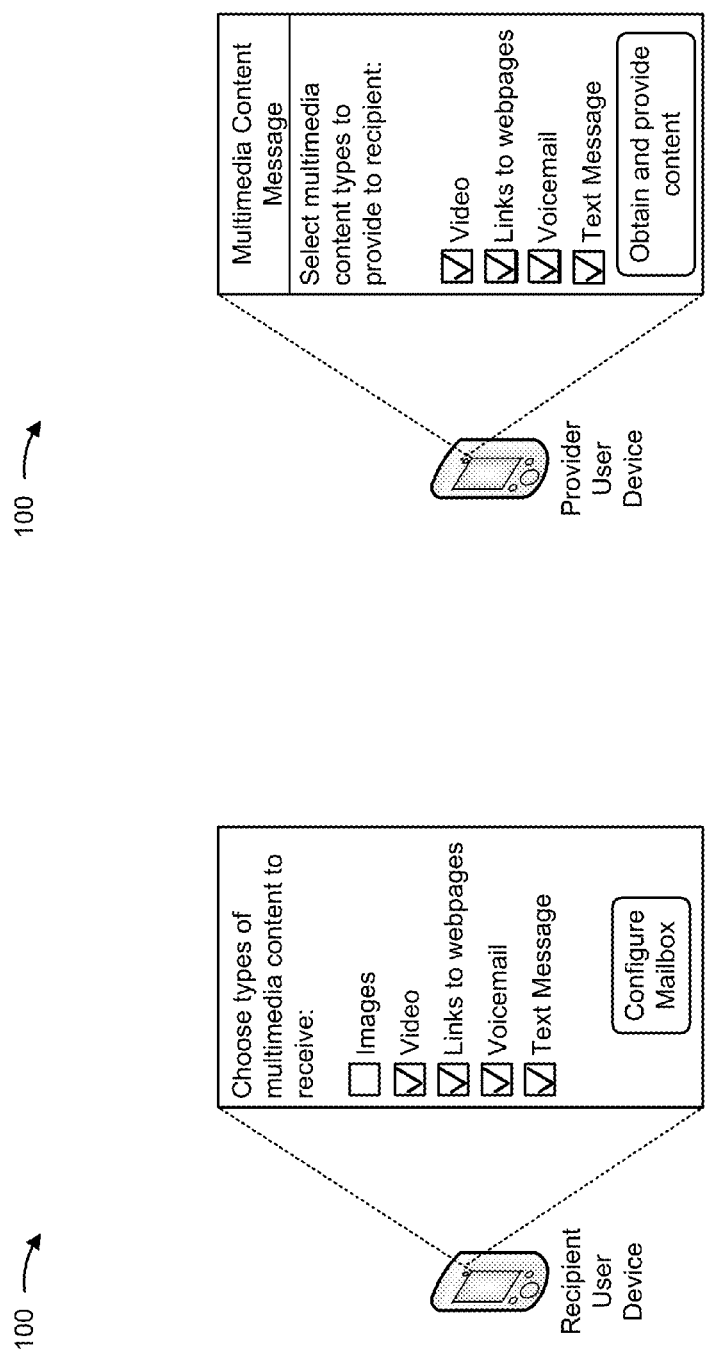

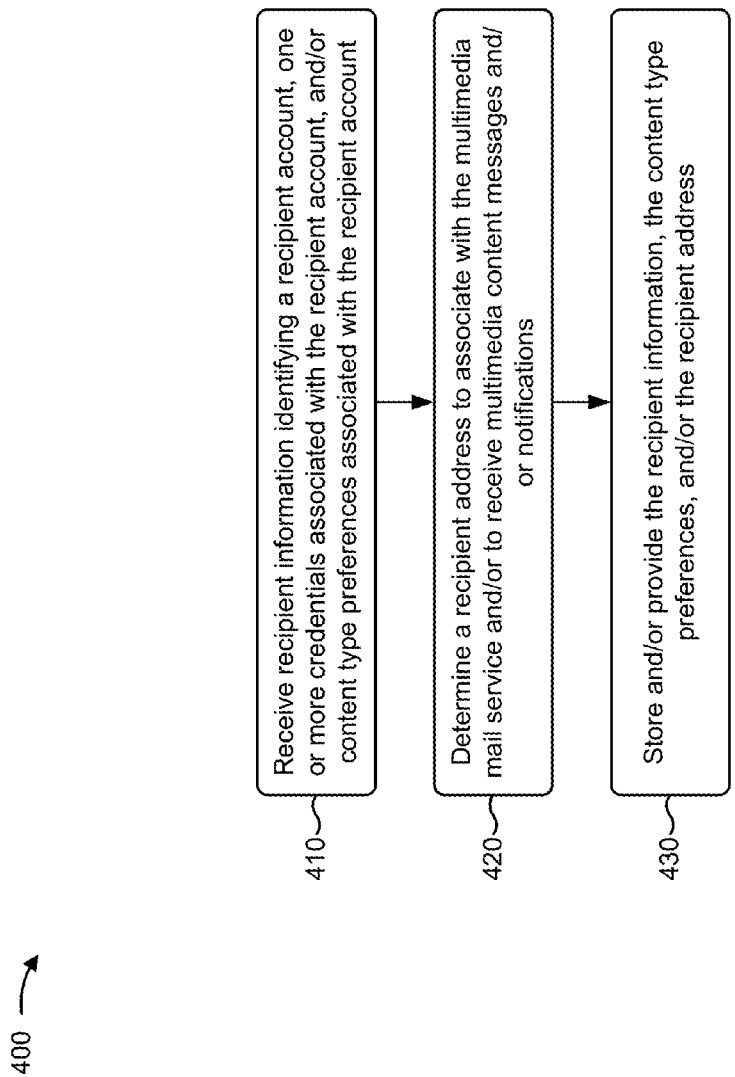

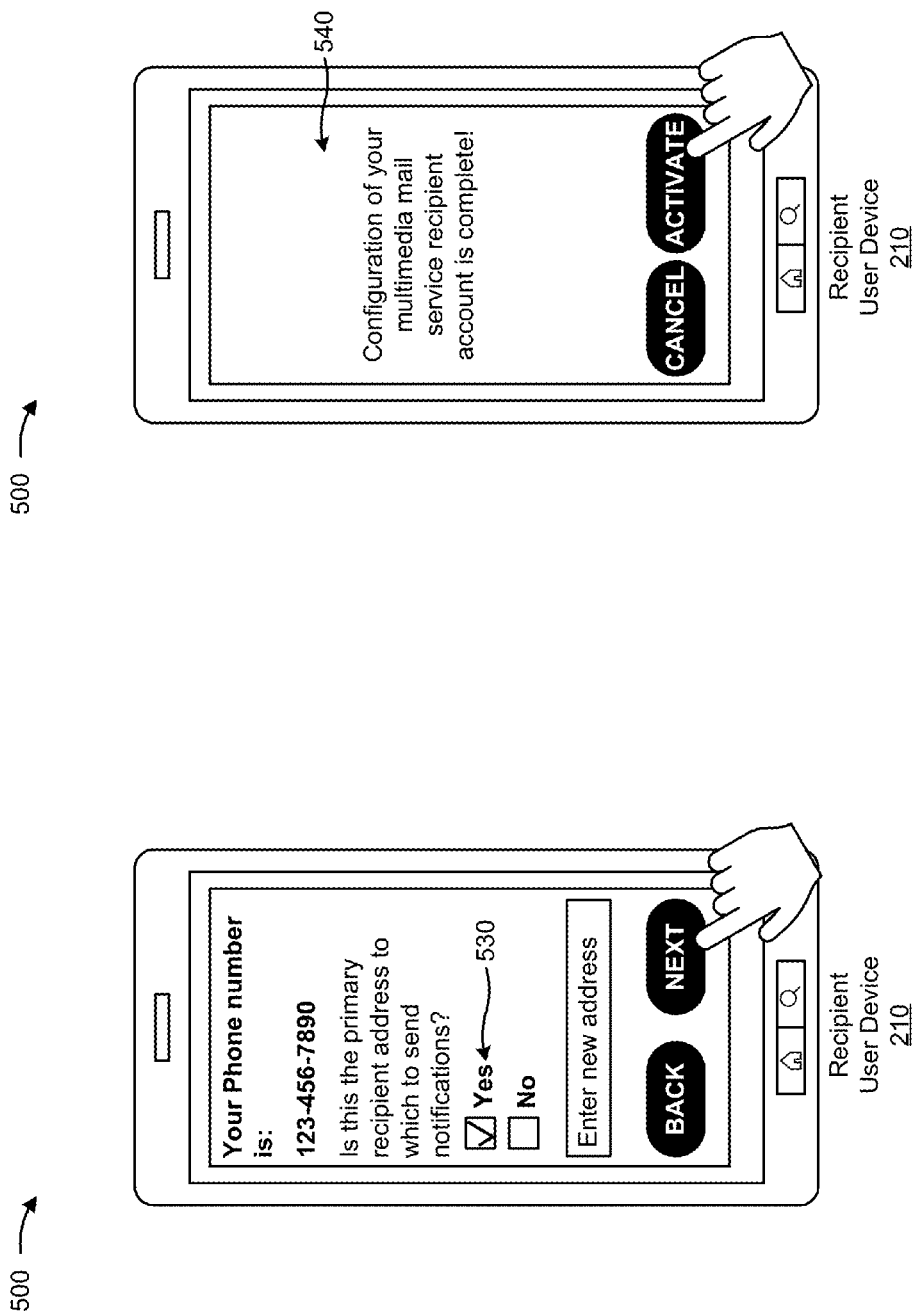

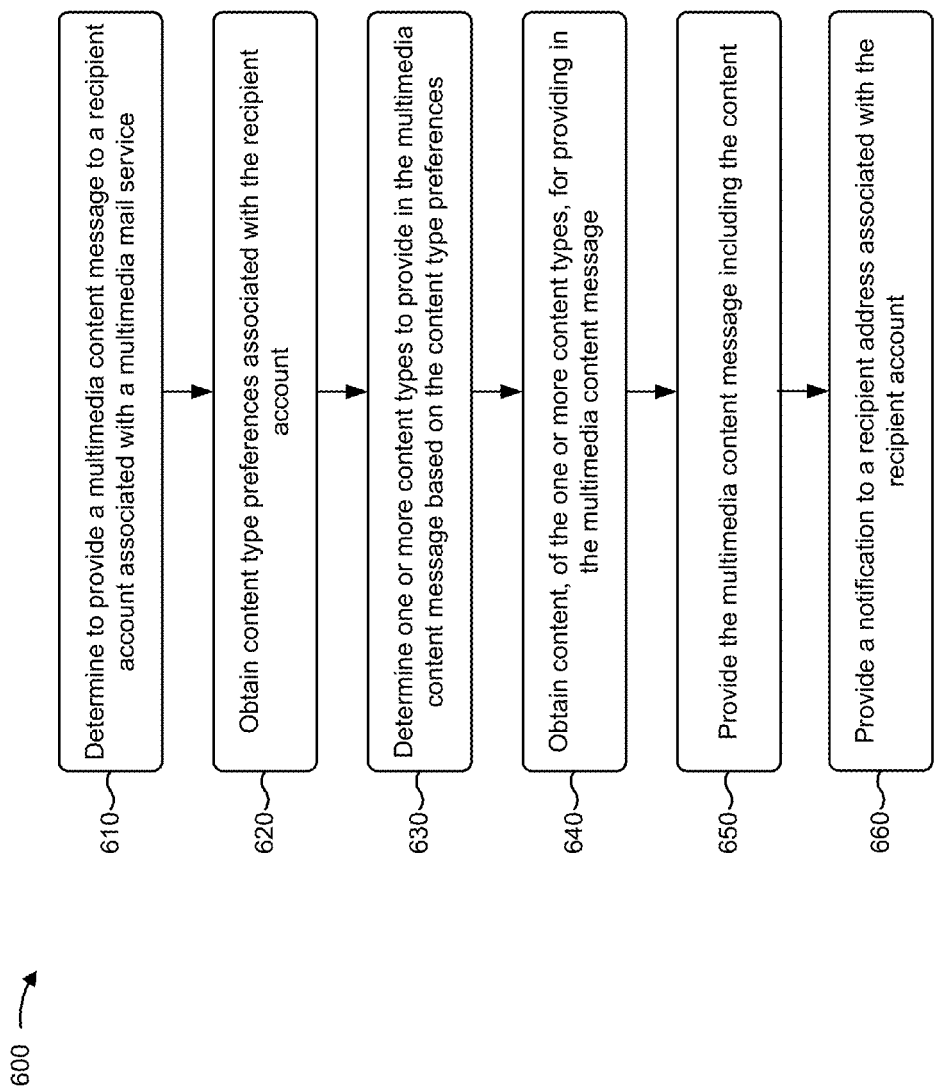

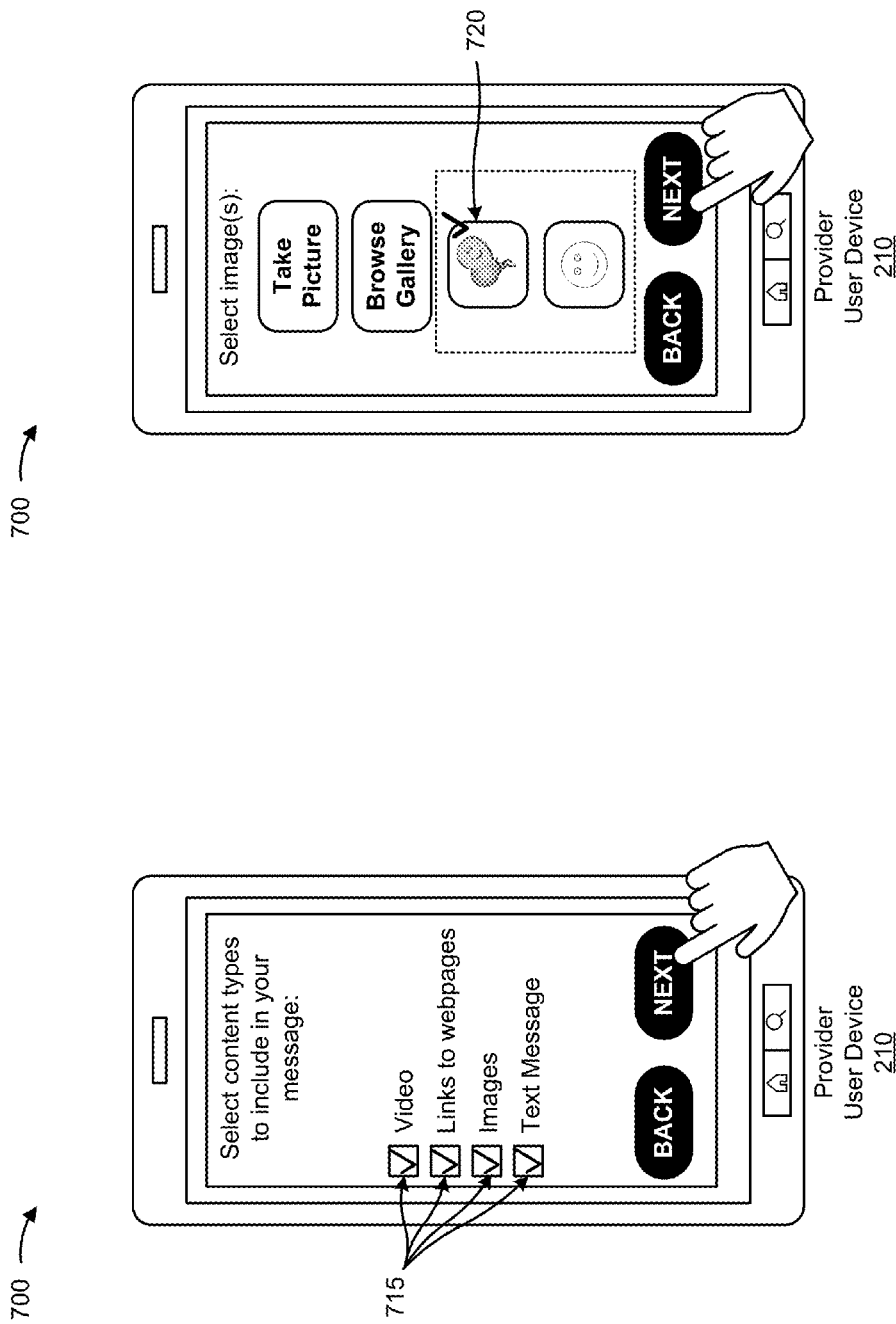

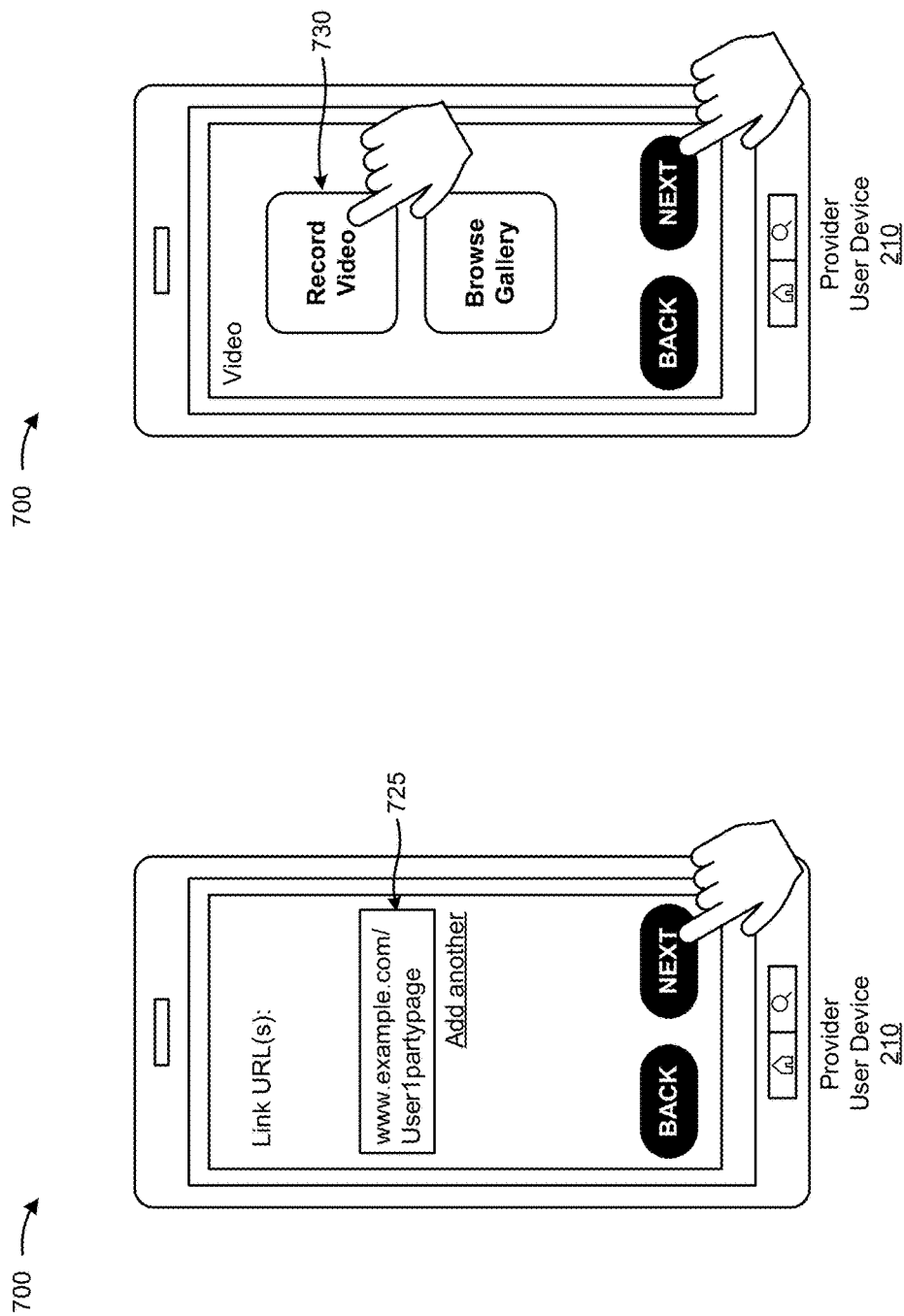

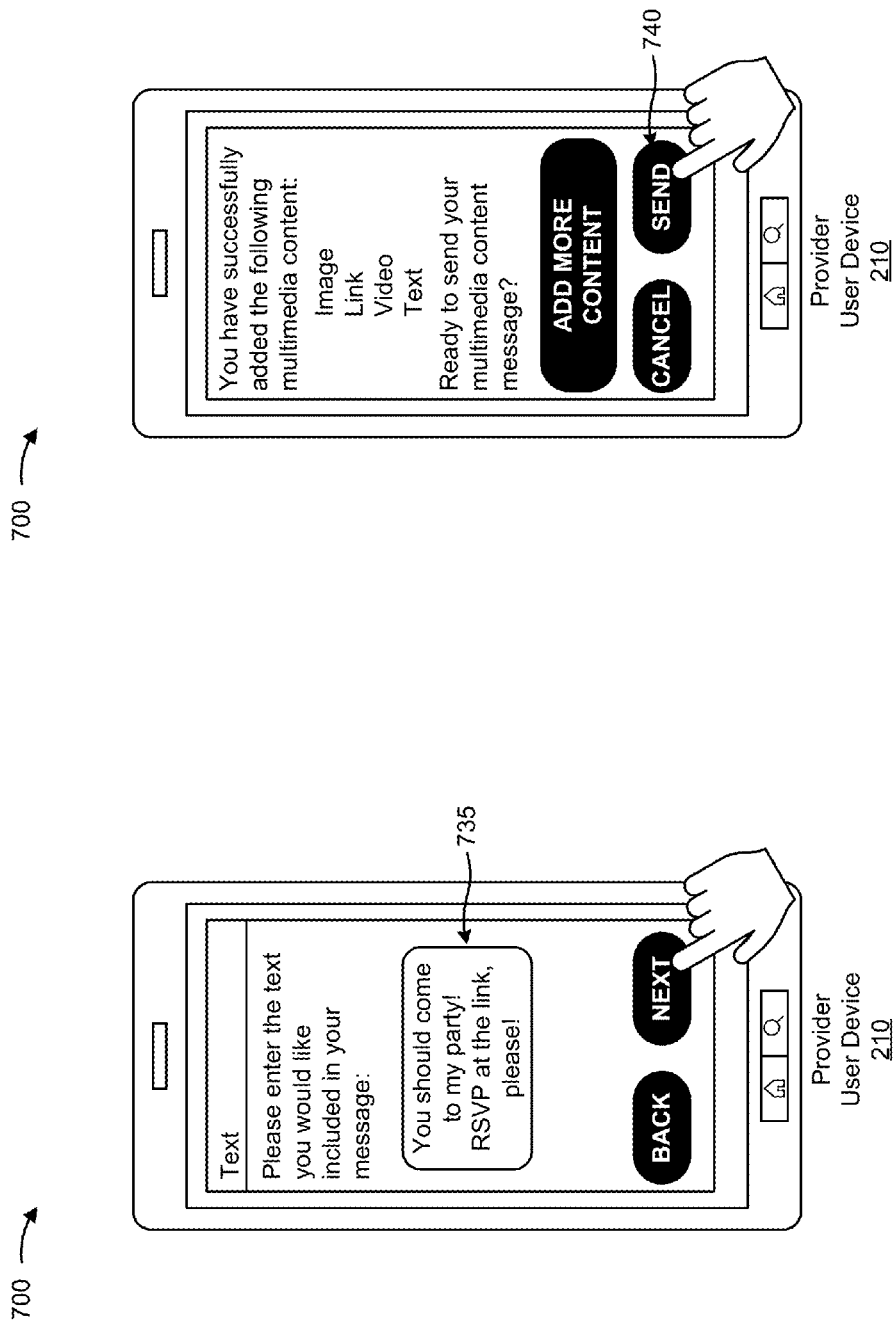

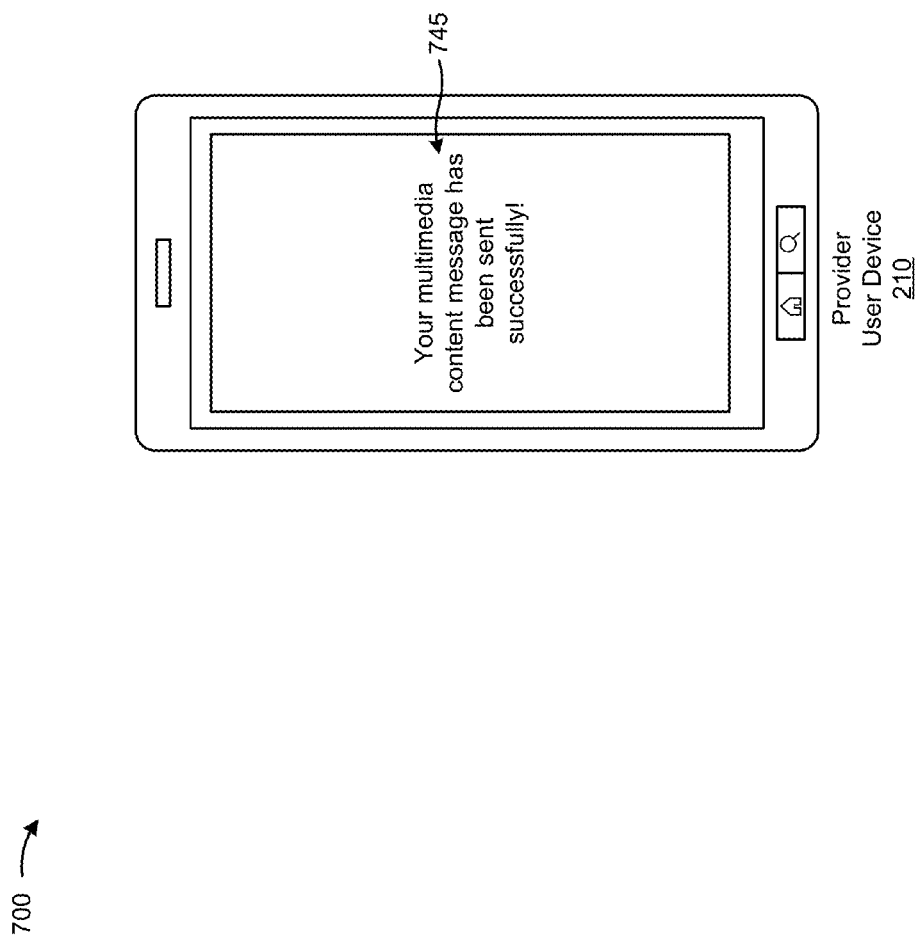

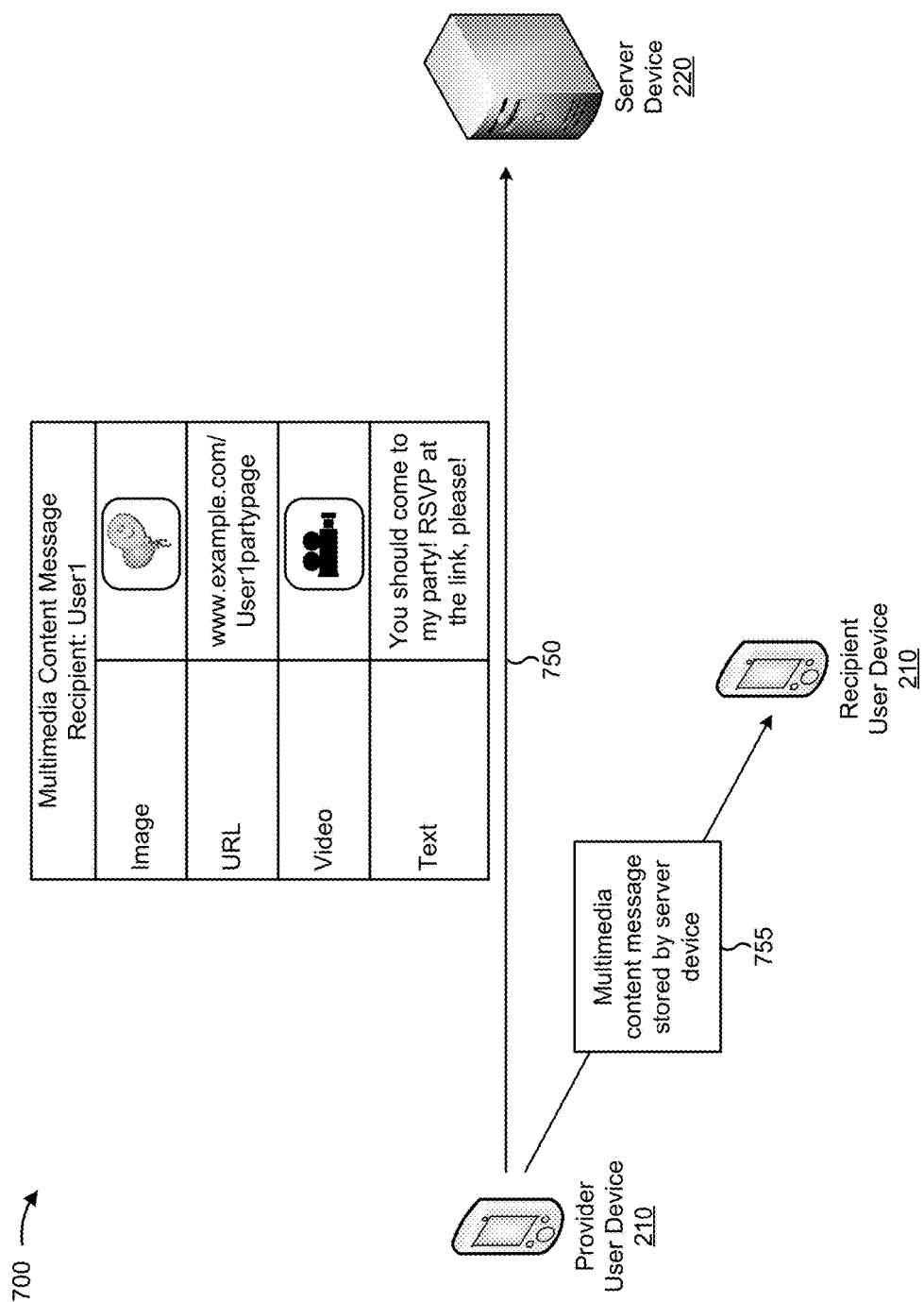

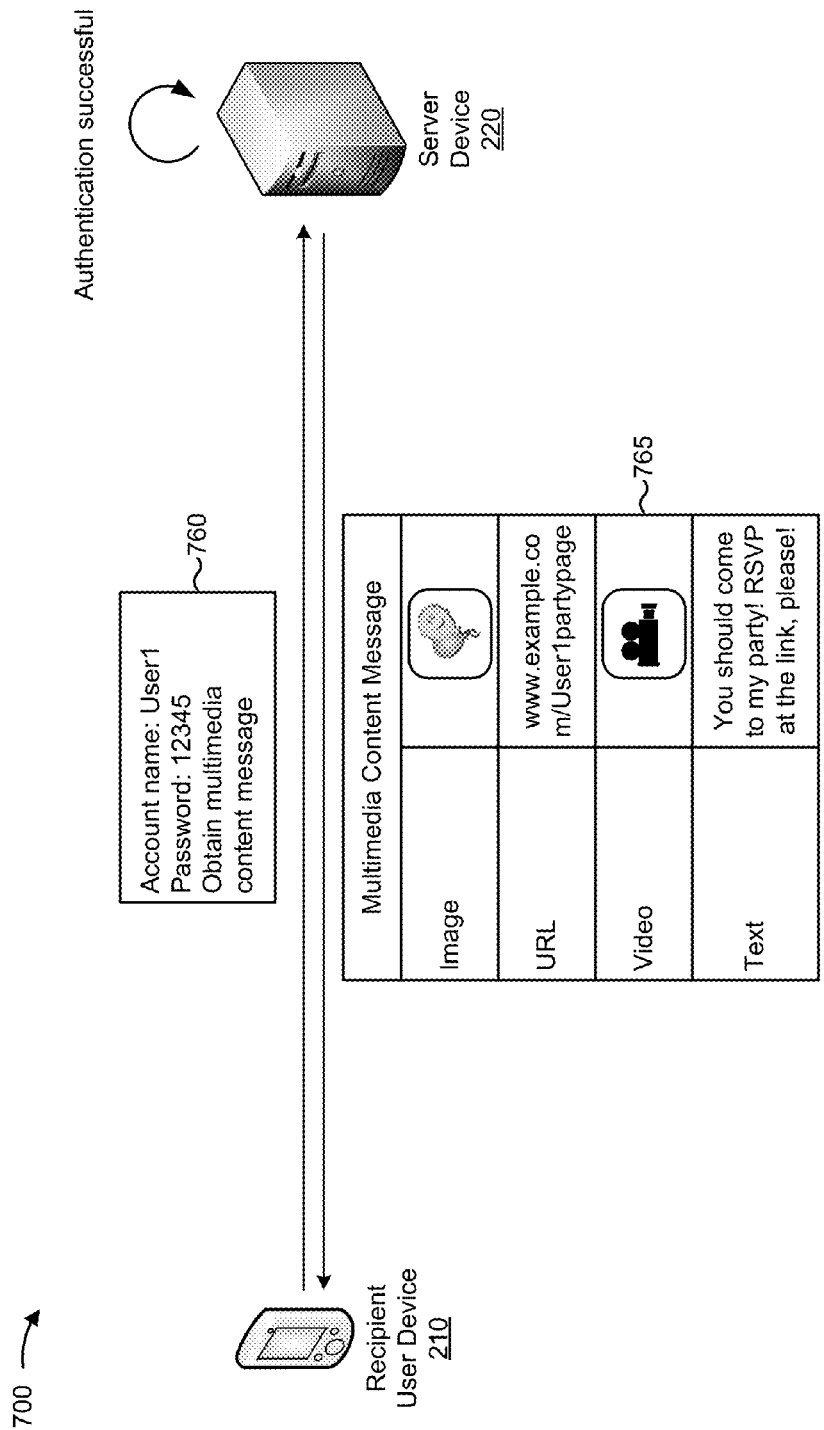

MULTIMEDIA MAIL SERVICE

BACKGROUND

A user device may provide, to a user of the user device, content that is received from another user device. The user device may receive the content based on the other user device attempting to contact the user device. For example, the user device may receive a voicemail, a text message, or the like, from the other user device, based on an unanswered call from the other user device. The content may be of a variety of content types, such as audio content, video content, image content, text content, and so on.

BRIEF DESCRIPTION OF THE DRAWINGS

FIGS. 1A-1C are diagrams of an overview of an example implementation described herein;

FIG. 4 is a flow chart of an example process for configuring a multimedia mail service;

FIGS. 5A-5E are diagrams of an example implementation relating to the example process shown in FIG. 4;

FIG. 6 is a flow chart of an example process for providing a multimedia content message to a recipient user device; and FIGS. 7A-7K are diagrams of an example implementation relating to the example process shown in FIG. 6.

DETAILED DESCRIPTION OF PREFERRED EMBODIMENTS

The following detailed description of example implementations refers to the accompanying drawings. The same reference numbers in different drawings may identify the same or similar elements.

A provider user device may provide content to a recipient user device. The content may be of a variety of content types, such as audio content, video content, image content, text content, documents, payment information, advertisements, or the like. The recipient user device may want receive some content types, and may not want to receive other content types. The provider user device may want to provide multiple, different content types to the recipient user device in a particular message. For example, the provider user device may want to provide text content, audio content, and image content to the recipient user device based on the recipient user device not answering a voice call from the provider user device. Implementations described herein may enable the provider user device to provide a variety of content types in a single multimedia content message, which may improve efficiency and/or conserve battery power and/or processor power of the provider user device. Implementations described herein may enable the recipient user device to control which content types are provided in the multimedia content message, which may conserve processor power and/or network bandwidth that would otherwise be used to transmit unwanted content types to the recipient mobile device.

Figure 1C:
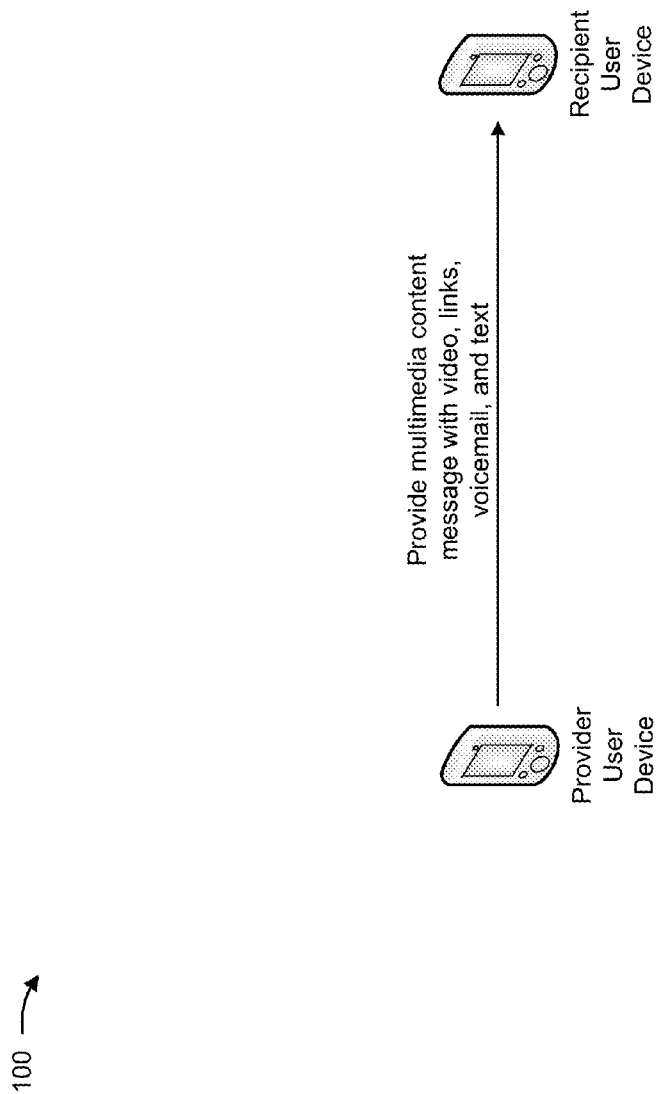

FIGS. 1A-1C are diagrams of an overview of an example implementation 100 described herein. For the purpose of FIGS. 1A-1C, assume that a recipient user device has created a recipient account associated with a multimedia mail service.

As shown in FIG. 1A, the recipient user device may provide a user interface to configure a multimedia mail service. As shown, the user interface may identify a variety of content types that the recipient user device may receive via the multimedia mail service. As further shown, the recipient user device may receive an interaction to select one or more content types, of the variety of content types, to receive via the multimedia mail service. Here, the recipient user device receives an interaction to select video content, links to webpages, voicemail content, and text messages. Based on the interaction, the recipient user device may receive multimedia content messages including video content, links to webpages, voicemail content, and/or text messages.

As shown in FIG. 1B, a provider user device may determine to provide a multimedia content message to the recipient user device. Assume that the provider user device obtains content type preferences from the recipient user device and/or another device. Assume further that the content type preferences identify the content types that the recipient user device may receive (e.g., video content, links to webpages, voicemail content, and text messages). As shown, the provider user device may provide an interface listing the content types identified by the content type preferences. Note that an image content type is not listed, based on the recipient user device not including the image content type in the content type preferences. As further shown, the provider user device may receive an interaction with the interface to select one or more content types of the content types identified by the content type preferences. Here, the provider user device receives an interaction to select all of the content types identified by the content type preferences. Assume that the provider user device obtains video content, one or more links to webpages (e.g., one or more uniform resource locators (URLs)), voicemail content, and text content to provide to the recipient user device in a multimedia content message.

As shown in FIG. 1C, the provider user device may provide a multimedia content message to the recipient user device. As further shown, the multimedia content message may include video content, one or more URLs, voicemail content, and text content. In some implementations, the provider user device may provide the multimedia content message to another device (e.g., a server device), which may provide the multimedia content message to the recipient user device.

In this way, a recipient user device may specify particular content types to receive from a provider user device in a multimedia content message. By specifying particular content types to receive, the recipient user device may conserve battery power, improve performance, and/or improve a user experience provided by the recipient user device. By providing particular content types based on content type preferences of the recipient user device, the provider user device may conserve network bandwidth, processor power, and/or storage space which may otherwise be used for content that is unwanted by a user associated with the recipient user device. By providing multiple content types in a single multimedia message, the provider user device may improve efficiency of providing the multiple content types, which may conserve battery power and/or processor power of the provider user device, and may conserve network bandwidth.

Figure 2:
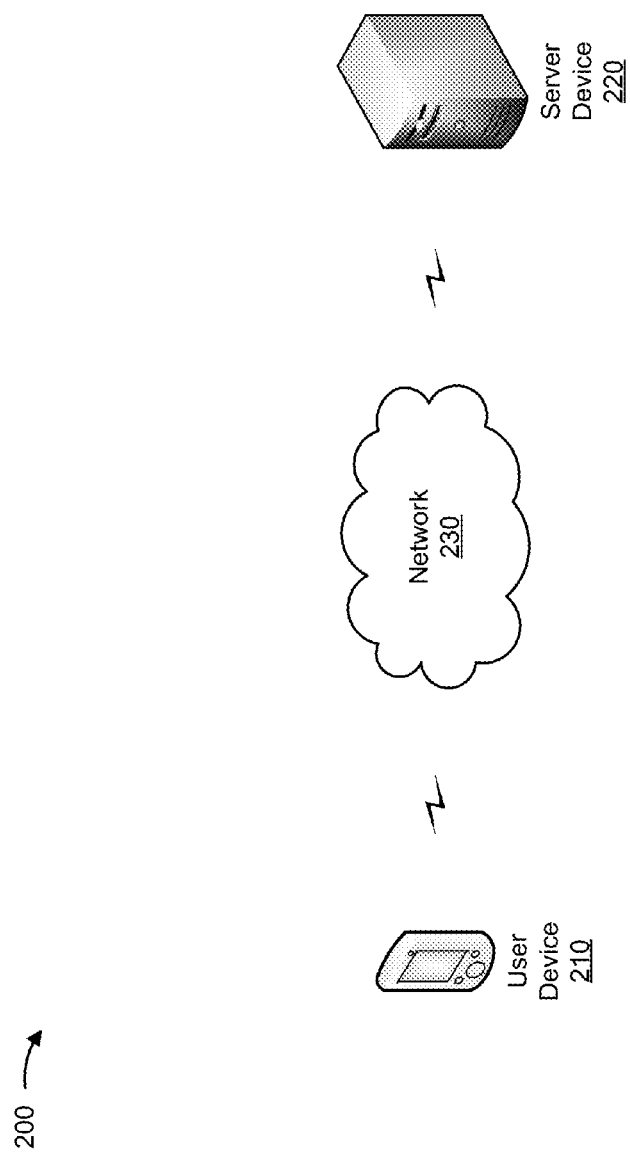
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, and a network 230. Devices of environment 200 may interconnect via wired connections, wireless connections, or a combination of wired and wireless connections.

User device 210 may include one or more devices capable of receiving, generating, storing, processing, and/or providing information, such as content of a variety of content types. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may receive content (e.g., an audio call, a video call, a recorded audio message, a recorded video message, an email, a text message, a link to a webpage, an image, a video, digital payment information, etc.) from another device (e.g., another user device 210, server device 220, etc.) in a multimedia content message. The other device may provide the content based on content type preferences associated with user device 210 (e.g., content type preferences provided to the other device by user device 210, content type preferences stored by server device 220, etc.). In some implementations, user device 210 may be identified by a device identifier and/or a recipient address (e.g., a mobile station identifier (MSID), a mobile directory number (MDN), an international mobile station equipment identity (IMEI), etc.).

Server device 220 may include one or more devices capable of storing, processing, and/or providing information. For example, server device 220 may include a server device or a collection of server devices. Server device 220 may receive recipient information (e.g., a recipient account name, one or more credentials, one or more recipient addresses, content type preferences, etc.), may store the recipient information, and/or may provide part or all of the recipient information to another device (e.g., user device 210, etc.) to facilitate a multimedia mail service. In some implementations, server device 220 may receive content in a multimedia content message, may store the multimedia content message, and/or may provide the multimedia content message and/or a notification based on the multimedia content message (e.g., to user device 210, to a device associated with a recipient address, etc.). In some implementations, server device 220 may authenticate user device 210 based on recipient information (e.g., a recipient account name, one or more credentials, one or more recipient addresses, etc.) to permit or deny user device 210 access to a multimedia content message.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
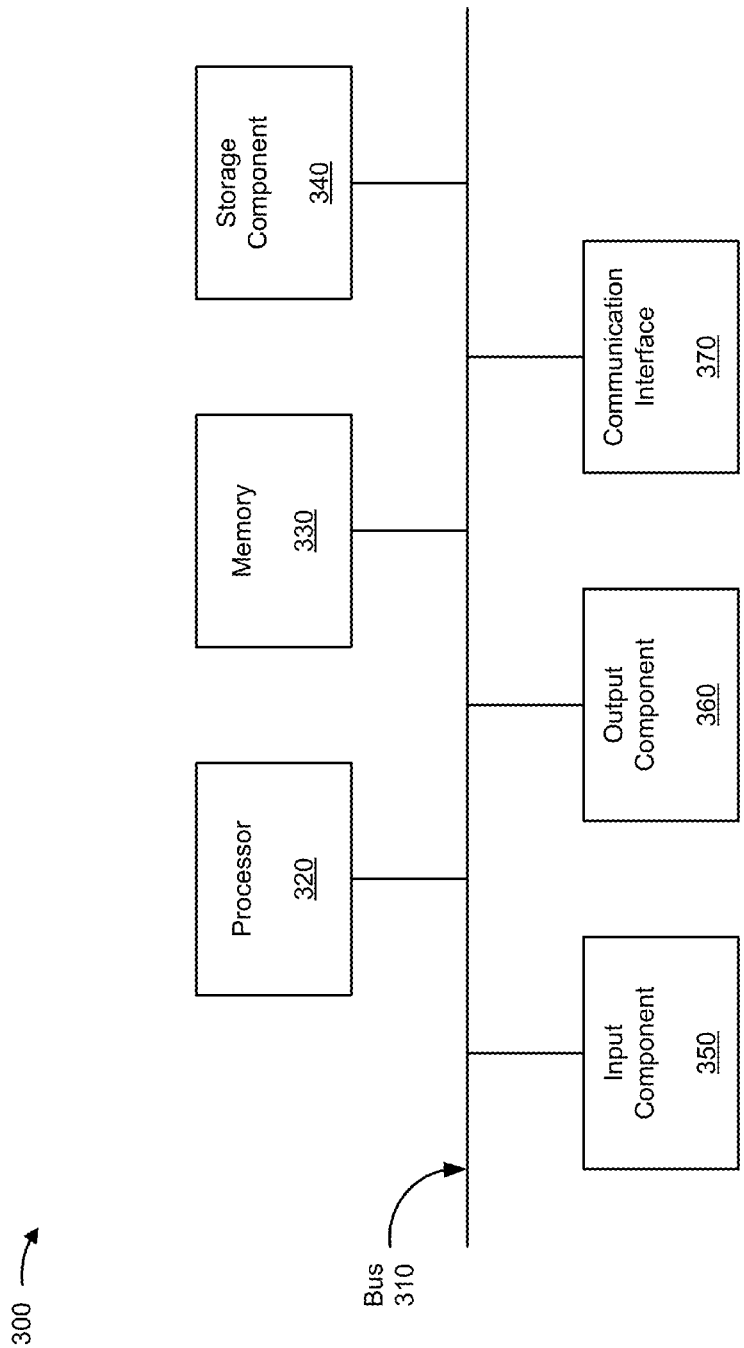
FIG. 3 is a diagram of example components of one or more devices of FIG. 2.

FIG. 3 is a diagram of example components of a device 300. Device 300 may correspond to user device 210 and/or server device 220. In some implementations, user device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for configuring a multimedia mail service. In some implementations, one or more process blocks of FIG. 4 may be performed by user device 210. In some implementations, one or more process blocks of FIG. 4 may be performed by another device or a set of devices separate from or including user device 210, such as server device 220.

As shown in FIG. 4, process 400 may include receiving recipient information identifying a recipient account, one or more credentials associated with the recipient account, and/or content type preferences associated with the recipient account (block 410). For example, user device 210 may receive recipient information. The recipient information may identify a recipient account for accessing a multimedia mail service and/or receiving multimedia content messages. In some implementations, the recipient information may include content type preferences and/or one or more credentials associated with the recipient account. Based on the recipient information, user device 210 may create a recipient account, and/or may configure and/or provide access to a multimedia mail service associated with the recipient account.

In some implementations, the recipient information may include information that identifies a recipient account. A recipient account may be an account, corresponding to a multimedia mail service, that is associated with content type preferences and/or one or more credentials to permit a user and/or user device 210 to access and/or manage the multimedia mail service. The recipient account may be associated with a recipient account name, one or more credentials (e.g., a password, a pass phrase, a security key, biometric information, etc.), one or more recipient addresses (e.g., one or more device identifiers, one or more email addresses, one or more phone numbers, one or more network addresses, etc.), information identifying a user associated with the recipient account (e.g., an international mobile subscriber identity (IMSI), a name of the user, an account identifier of the user, etc.), and/or content type information. User device 210 may configure and/or provide access to the multimedia mail service based on the recipient information.

In some implementations, user device 210 may cause a recipient account to be created based on the recipient information. For example, user device 210 may provide a user interface to receive recipient information for the purpose of creating a recipient account. User device 210 may receive recipient information, such as a recipient account name, one or more credentials, one or more recipient addresses to associate with the recipient account, or the like, via the user interface. In some implementations, user device 210 may receive the recipient information via the user interface. In some implementations, user device 210 may determine that no existing recipient account is associated with the recipient information (e.g., based on querying server device 220 that stores recipient information, etc.). Based on the recipient information, user device 210 may cause a recipient account to be created. A user associated with the recipient account may access the multimedia mail service via user device 210 and/or another device (e.g., another user device 210, etc.), for example, by inputting the recipient account name and/or the one or more credentials to user device 210 and/or the other device. In this way, user device 210 may cause a recipient account to be created, which may enable a user to access the multimedia mail service using a variety of devices.

In some implementations, user device 210 may receive the recipient information based on a user attempting to access a multimedia mail service. For example, a user of user device 210 (e.g., a recipient of a multimedia content message) may input, to user device 210, the recipient account name and/or one or more credentials associated with the recipient account. User device 210, or another device (e.g., server device 220) may authenticate the one or more credentials, and may permit the user to access the multimedia mail service based on authenticating the one or more credentials (e.g., to obtain a multimedia content message, to configure the multimedia mail service, etc.). In this way, user device 210 may permit a user to access a multimedia mail service based on recipient information.

In some implementations, user device 210 may receive content type preferences. The content type preferences may specify one or more content types of a group of content types. User device 210 may permit another device (e.g., another user device 210, server device 220, etc.) to provide content of the one or more content types to user device 210 in a multimedia content message. In some implementations, user device 210 may receive the content type preferences via a user interface of user device 210 (e.g., based on an interaction with the user interface by a user associated with the recipient account).

In some implementations, the content may include information and/or media that user device 210 is capable of providing to a recipient. For example, the content may include text (e.g., a short message service (SMS) message, an email message, a string of one or more characters, etc.), an image (e.g., an image provided from a gallery of images, an image captured by a camera of user device 210, etc.), a video file (e.g., a video stored by a device, a video captured by a camera of user device 210, etc.), an audio file (e.g., recorded voice content, a song, etc.), a link to a webpage, an executable file, an advertisement, location information (e.g., coordinates for a map application of user device 210, driving directions, etc.), information related to a payment system (e.g., a virtual currency wallet address, bank account information, credit card information, etc.), a document (e.g., a text document, a spreadsheet, a presentation, etc.), a compressed file, or the like.

The content type preferences may identify one or more content types that recipient user device 210 permits a multimedia content message to contain. For example, a user associated with user device 210 may want to receive content of some content types, and may not want to receive content of other content types. User device 210 may receive content type preferences that identify particular content types permitted to be received, or not to be received, by user device 210. For example, the content type preferences may indicate to provide only video content to user device 210, may indicate not to provide advertising content to user device 210, or the like. In some implementations, the content type preferences may be associated with a particular device. For example, a user may want to receive work-related content via a first user device 210, and may want to receive other content via a second user device 210. In such cases, the content type preferences may specify content types to provide to the first user device 210 and/or the second user device 210. In this way, user device 210 may control content types received by user device 210, which may improve battery life, reduce data consumption, reduce network congestion, and/or improve a user experience associated with a multimedia mail service.

In some implementations, user device 210 may determine the content type preferences based on capabilities of user device 210. For example, assume that user device 210 is incapable of processing and/or providing a particular content type to a recipient. In such cases, user device 210 may determine content type preferences that indicate not to provide the particular content type. Additionally, or alternatively, user device 210 may determine the content type preferences based on a user input. For example, user device 210 may provide a list of content types, via a user interface, to a user of user device 210, and the user may select one or more content types from the list of content types. In this way, user device 210 may determine content types to permit in a multimedia content message, which may conserve network resources and/or processor power of user device 210 by preventing unwanted content types from being provided to user device 210.

In some implementations, user device 210 may determine the content type preferences based on a speed and/or quality of a network connection of user device 210. For example, assume that user device 210 is connected to a cellular data network. Assume further that the connection with the cellular data network is too slow to effectively provide video content to user device 210. In such cases, user device 210 may determine content type preferences that indicate not to provide video content to user device 210. In this way, user device 210 may determine content type preferences based on a speed and/or quality of a network connection, which may enable user device 210 to receive content more efficiently.

In some implementations, user device 210 may determine the content type preferences based on a location of user device 210. For example, assume that user device 210 stores a first set of content type preferences and a second set of content type preferences. Assume that the first set of content type preferences are associated with a first location (e.g., a workplace location, etc.), and that the second set of content type preferences are associated with a second location (e.g., a home location, etc.). In such cases, user device 210 may select the first set of content type preferences when user device 210 is located at the first location, and may select the second set of content type preferences when user device 210 is located at the second location. In this way, user device 210 may select content type preferences based on a location of user device 210, which may conserve battery power and/or prevent user device 210 from receiving content inappropriate to a particular location.

As further shown in FIG. 4, process 400 may include determining a recipient address to associate with the multimedia mail service and/or to receive multimedia content messages and/or notifications (block 420). For example, user device 210 may determine a recipient address to associate with the multimedia mail service. The recipient address may be a device identifier, a network address, an email address, or the like, to which user device 210 and/or server device 220 may provide multimedia content messages and/or notifications related to multimedia content messages. For example, user device 210 and/or server device 220 may receive a multimedia content message destined for a recipient account, and may provide, to a device and/or service associated with the recipient address, the multimedia content message and/or a notification related to the multimedia content message.

In some implementations, user device 210 and/or server device 220 may prevent a device not associated with a recipient address from accessing the multimedia mail service. For example, the recipient address may be associated with a particular user device 210 that is permitted to access the multimedia mail service. Server device 220, or another device, may prevent user devices 210 other than the particular user device 210 from accessing the multimedia mail service. In this way, user device 210 and/or server device 220 may restrict access to the multimedia mail service by devices not associated with a recipient address, which may improve security of the multimedia mail service.

In some implementations, the recipient address may be a device identifier that identifies user device 210. For example, assume that a user configures a multimedia mail service using user device 210. In such cases, user device 210 may determine the recipient address to be a device identifier that identifies user device 210. User device 210 may prompt the user to confirm the device identifier as the recipient address and/or to provide another recipient address other than the device identifier.

In some implementations, user device 210 may receive multiple recipient addresses. For example, a user may own multiple user devices 210, each of which may be associated with a respective recipient address. User device 210 may receive multiple recipient addresses associated with the multiple user devices 210. In some implementations, user device 210 may permit access to the multimedia mail service by the multiple user devices 210 based on the multiple recipient addresses, may provide notifications to one or more of the multiple user devices 210, and/or may provide multimedia content messages to one or more of the multiple user devices 210.

In some implementations, a first user device 210 may determine a recipient address associated with the first user device 210, and/or a recipient address associated with a second user device 210. For example, assume that a user is associated with (e.g., uses, owns, etc.) a first user device 210 and a second user device 210. Assume that the first user device 210 is identified by a first device identifier, and assume that the second user device 210 is identified by a second device identifier. Assume further that the user configures a multimedia mail service via an interface of the first user device 210. In some implementations, the first user device 210 may determine the first device identifier as the recipient address. For example, a user may provide the first device identifier as the recipient address, the first user device 210 may determine the first device identifier based on a default rule, or the like. In such implementations, the first user device 210 may receive notifications and/or multimedia content messages destined for the recipient account, which may simplify configuration and/or implementation of the multimedia mail service.

Additionally, or alternatively, the first user device 210 may determine the second device identifier to be the recipient address. For example, the user may specify to use the second device identifier as the recipient address (e.g., by inputting the second device identifier, by selecting the second device identifier from a menu of device identifiers associated with the recipient account, etc.). In that case, a device (e.g., the first user device 210, server device 220, etc.) may provide notifications and/or multimedia content messages to the second user device 210. In this way, a first user device 210 may cause notifications and/or multimedia content messages to be provided to a second user device 210, which may be more convenient for the user and/or may conserve processor power and/or battery power of the first user device 210 that would otherwise be used to provide the notification and/or multimedia content message to a user.

As further shown in FIG. 4, process 400 may include storing and/or providing the recipient information, the content type preferences, and/or the recipient address (block 430). For example, user device 210 may store and/or provide the recipient information, the content type preferences, and/or the recipient address. In some implementations, user device 210 may provide the recipient information, the content type preferences, and/or the recipient address to server device 220 or another device for storage. User device 210 and/or server device 220 may provide a multimedia mail service based on the recipient information, the content type preferences, and/or the recipient address.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of configuring a multimedia mail service.

Figures 5A, 5B:
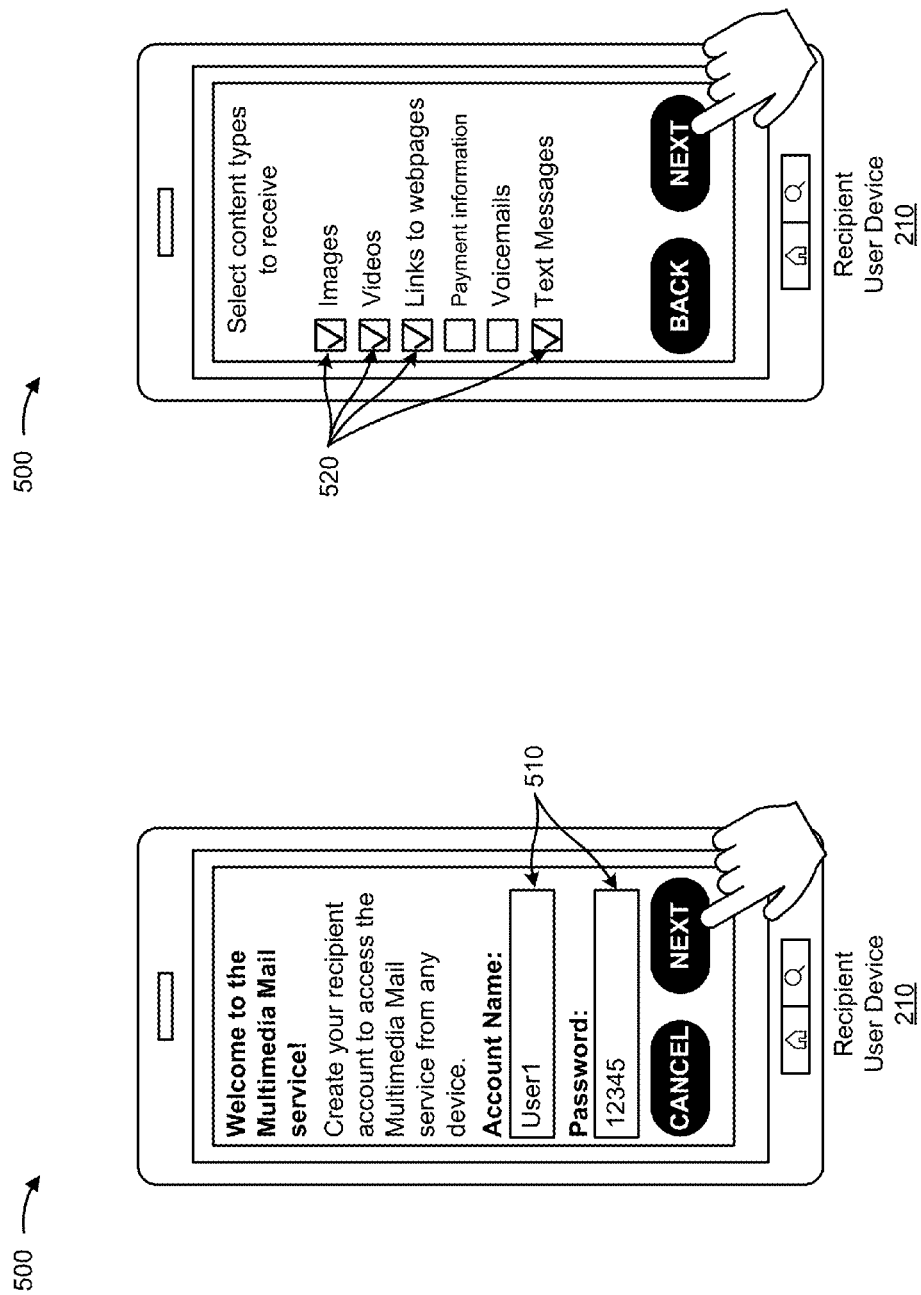

As shown in FIG. 5A, recipient user device 210 may provide a user interface to configure a multimedia mail service. As shown by reference number 510, recipient user device 210 may receive a recipient account name (e.g., "User1") and a credential (e.g., a password of "12345") via the user interface. As shown, recipient user device 210 may receive an interaction to proceed to a next step of configuring the multimedia mail service.

As shown in FIG. 5B, recipient user device 210 may receive content type preferences that identify content types of content to receive via the multimedia mail service. As shown, the content types may include images, video, links to webpages, payment information, voicemails, and text messages. As shown by reference number 520, recipient user device 210 may determine selected content types. Here, assume that recipient user device 210 receives an interaction to select the content types of image content, video content, links to webpages, and text content. As shown, recipient user device 210 may receive an interaction to proceed to a next step of configuring the multimedia mail service.

As shown in FIG. 5C, recipient user device 210 may determine a recipient address to which to provide notifications. As shown, recipient user device 210 determines a phone number of recipient user device 210. Assume that the phone number of 123-456-7890 is associated with recipient user device 210. As shown by reference number 530, recipient user device 210 may receive an interaction to confirm to use the phone number of 123-456-7890 as the recipient address. As shown, recipient user device 210 may permit a user to input a recipient address other than the phone number of 123-456-7890. Here, the user does not input another recipient address. As shown, recipient user device 210 may receive an interaction to proceed to a next step of configuring the multimedia mail service.

As shown in FIG. 5D, and by reference number 540, recipient user device 210 may provide an indication, to a user of recipient user device 210, that configuration of the recipient account for the multimedia mail service is complete. As further shown, recipient user device 210 may receive an interaction to activate the recipient account.

Figure 5E:
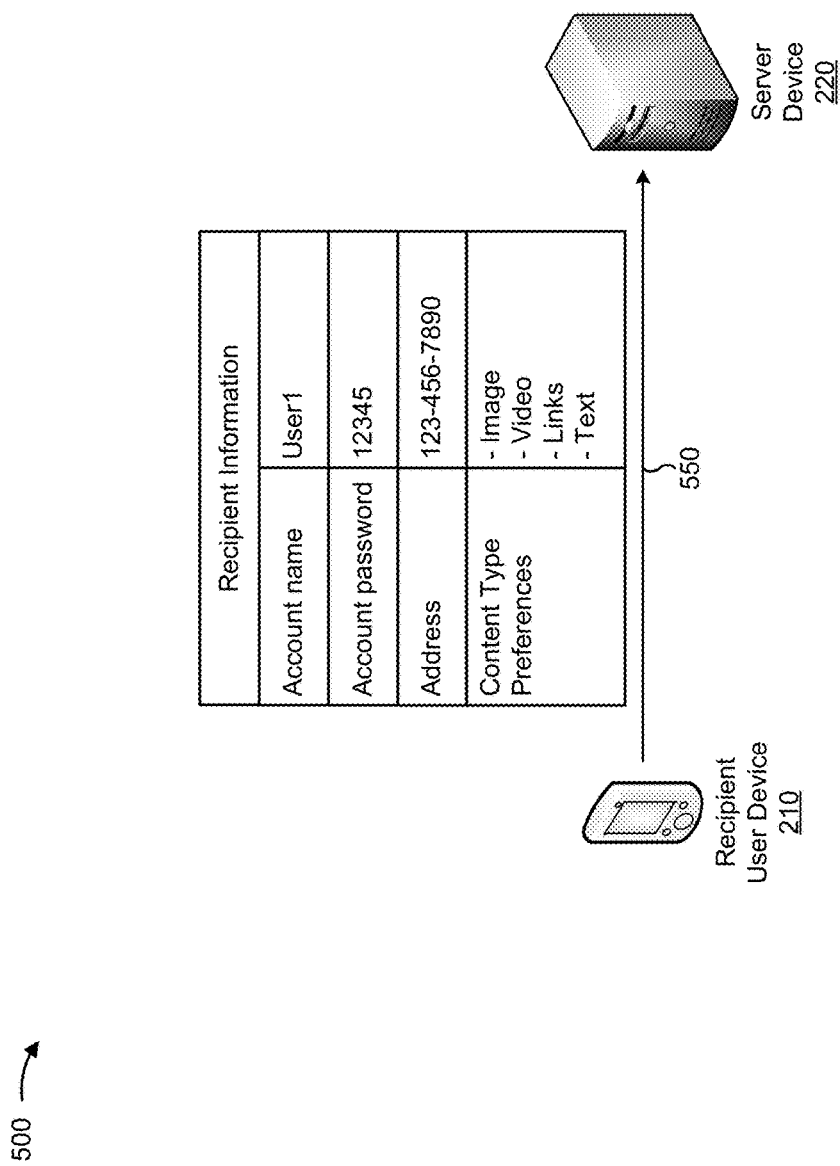

As shown in FIG. 5E, and by reference number 550, recipient user device 210 may provide recipient information to server device 220. Assume that recipient user device 210 provides the recipient information to server device 220 based on the interaction to activate the recipient account. As shown, the recipient information may include the recipient account name (e.g., User1), the recipient account password (e.g., 12345), the recipient address (e.g., the phone number of 123-456-7890) and the content type preferences (e.g., that specify image content, video content, links to webpages, and text messages). Assume that server device 220 stores the recipient information.

As indicated above, FIGS. 5A-5E are provided merely as an example. Other examples are possible and may differ from what was described with regard to FIGS. 5A-5E.

FIG. 6 is a flow chart of an example process 600 for providing a multimedia content message to a recipient user device. In some implementations, one or more process blocks of FIG. 6 may be performed by user device 210. In some implementations, one or more process blocks of FIG. 6 may be performed by another device or a set of devices separate from or including user device 210, such as server device 220.

As shown in FIG. 6, process 600 may include determining to provide a multimedia content message to a recipient account associated with a multimedia mail service (block 610). For example, provider user device 210 may determine to provide a multimedia content message to a recipient account associated with a multimedia mail service. The recipient account may be associated with recipient user device 210 and/or a user of recipient user device 210. In some implementations, provider user device 210 may determine to provide the multimedia content message based on a communication with recipient user device 210. For example, a communication (e.g., a voice call, a video call, etc.) from provider user device 210 may not be answered by recipient user device 210, and provider user device 210 may determine to provide a multimedia content message based on the unanswered communication.

In some implementations, provider user device 210 may determine to provide a multimedia content message based on information stored by another device. For example, provider user device 210 may query server device 220 for recipient information to determine if recipient user device 210 is associated with a multimedia mail service. Additionally, or alternatively, provider user device 210 may receive, from recipient user device 210, information indicating that recipient user device 210 is associated with a multimedia mail service. For example, based on recipient user device 210 not answering a voice call originating from provider user device 210, provider user device 210 may receive content type preferences and/or a recipient address from recipient user device 210.

In some implementations, provider user device 210 may determine to provide a multimedia content message based on a user interaction. For example, provider user device 210 may receive a user interaction to cause provider user device 210 to provide a multimedia content message. In some implementations, provider user device 210 may provide an interface to facilitate the user interaction. For example, provider user device 210 may determine that a recipient account associated with recipient user device 210 is associated with a multimedia mail service, and may provide the interface to a user of provider user device 210 accordingly.

As further shown in FIG. 6, process 600 may include obtaining content type preferences associated with the recipient account (block 620). For example, provider user device 210 may determine to provide a multimedia content message to recipient user device 210. Based on determining to provide the multimedia content message, provider user device 210 may obtain content type preferences associated with a recipient account associated with recipient user device 210. The content type preferences may indicate one or more content types that provider user device 210 is permitted to provide to recipient user device 210.

In some implementations, provider user device 210 may obtain the content type preferences from recipient user device 210. For example, recipient user device 210 may provide the content type preferences to provider user device 210 based on a request from provider user device 210, based on a user of recipient user device 210 not answering a communication from provider user device 210, or the like. In this way, provider user device 210 and/or recipient user device 210 may reduce processing power and/or bandwidth requirements of provider user device 210.

Additionally, or alternatively, provider user device 210 may obtain the content type preferences from another device, such as server device 220, or the like. For example, provider user device 210 may request the content type preferences from server device 220 based on a device identifier of recipient user device 210, based on a recipient account name associated with recipient user device 210, or the like. In this way, provider user device 210 may reduce processor load and/or cellular data usage of recipient user device 210.

As further shown in FIG. 6, process 600 may include determining one or more content types to provide in the multimedia content message based on the content type preferences (block 630). For example, based on the content type preferences associated with the recipient account, provider user device 210 may determine one or more content types to provide in a multimedia content message to recipient user device 210. Provider user device 210 may obtain content of the one or more content types for providing to recipient user device 210 in a multimedia content message.

In some implementations, provider user device 210 may determine the one or more content types based on capabilities of provider user device 210. For example, assume that provider user device 210 obtains content type preferences of recipient user device 210 indicating that recipient user device 210 permits a first content type, a second content type, and a third content type to be transmitted to recipient user device 210. Assume further that provider user device 210 is capable of providing the first content type and the second content type, and assume that provider user device 210 is incapable of providing the third content type. In such cases, provider user device 210 may determine to provide the first content type and/or the second content type, and may determine not to provide the third content type. In this way, provider user device 210 may determine to provide content and/or not to provide content based on capabilities of provider user device 210, which may improve efficiency and/or simplify a user interface of provider user device 210.

In some implementations, provider user device 210 may determine the one or more content types based on content type preferences and/or based on a user interaction. For example, assume that provider user device 210 obtains content type preferences that indicate that recipient user device 210 permits five content types to be transmitted to recipient user device 210. Provider user device 210 may provide, via a user interface and to a user of provider user device 210, a list of the five content types. Provider user device 210 may receive an interaction to select one or more content types of the five content types (e.g., an interaction with one or more buttons associated with the one or more content types, etc.), and may determine the one or more content types based on the interaction. In this way, provider user device 210 may determine one or more selected content types to provide based on the content type preferences and/or based on a user interaction, which may simplify providing of a variety of content types to a user of recipient user device 210.

As further shown in FIG. 6, process 600 may include obtaining content, of the one or more content types, for providing in the multimedia content message (block 640). For example, provider user device 210 may obtain content for providing in a multimedia content message. The content may be of one or more content types identified by content type preferences associated with a recipient account and/or selected by provider user device 210. Provider user device 210 may provide the content to recipient user device 210 in a multimedia content message, which may simplify and/or improve efficiency of providing content of multiple, different content types.

In some implementations, provider user device 210 may receive the content from a user. For example, provider user device 210 may record audio content from a user, may record video content from a user, may receive text content via a user interface, may receive payment information via a user interface, may receive information identifying a particular webpage via a user interface, or the like. Additionally, or alternatively, provider user device 210 may obtain content. For example, provider user device 210 may receive a link to a webpage that hosts content, which provider user device 210 may obtain. As another example, provider user device 210 may receive information identifying a file, directory, etc. containing content, which provider user device 210 may obtain.

In some implementations, provider user device 210 may provide a user interface to obtain content. For example, assume that provider user device 210 obtains content type information that identifies audio content, video content, and text content as permitted content types. In that case, provider user device 210 may provide a user interface that enables a user to select a content type to provide, a particular order in which to provide content types, or the like. For example, provider user device 210 may receive an interaction to receive audio content, followed by video content, followed by text content. Based on the interaction, user device 210 may first record audio content, may second record video content, and may third obtain text content. In some implementations, provider user device 210 may provide the audio content, the video content, and the text content, to recipient user device 210, in the order in which the audio content, the video content, and the text content were received.

As further shown in FIG. 6, process 600 may include providing the multimedia content message including the content (block 650). For example, provider user device 210 may provide the multimedia content message, including the content, to recipient user device 210. Provider user device 210 may determine to provide the multimedia content message to recipient user device 210 based on recipient information (e.g., a recipient address) stored by server device 220, based on a previous interaction with recipient user device 210, based on an input by a user of provider user device 210 that specifies recipient user device 210, or the like. By providing content of one or more content types in a multimedia content message to recipient user device 210, provider user device 210 may simplify providing of and/or access to the one or more content types, may conserve processor power and/or battery power of provider user device 210 and/or recipient user device 210, and/or may improve efficiency of providing and/or accessing the one or more content types.

In some implementations, provider user device 210 may provide the multimedia content message to recipient user device 210 based on a recipient address. For example, assume that provider user device 210 determines a recipient account based on an interaction with a first user device 210. In some cases, provider user device 210 may obtain a recipient address that identifies a recipient user device 210 that is different than the first user device 210. In other cases, provider user device 210 may obtain a device identifier that identifies the first user device 210 as recipient user device 210.

In some implementations, provider user device 210 may provide the content in a particular order. For example, provider user device 210 may determine a particular order of content (e.g., based on a user interaction, based on receiving and/or obtaining the content in the particular order, based on a preference associated with recipient user device 210, etc.), and may provide the content in the particular order. Recipient user device 210 may provide the content to the user in the particular order, which may enable provider user device 210 to control a user experience of the recipient.

In some implementations, provider user device 210 may provide the multimedia content message to server device 220. For example, provider user device 210 may provide the multimedia content message, including the content, in association with information identifying recipient user device 210. Additionally, or alternatively, provider user device 210 may provide the multimedia content message in association with information identifying a recipient account associated with recipient user device 210, subscriber information of a user of recipient user device 210, or the like. Provider user device 210 and/or server device 220 may provide a notification to recipient user device 210 that identifies the multimedia content message, and recipient user device 210 may retrieve the multimedia content message from server device 220 based on the message, in some implementations. In this way, provider user device 210 may improve security of the multimedia content message by providing the multimedia content message to server device 220 for storage and/or providing to recipient user device 210.

As further shown, FIG. 6 may include providing a notification to a recipient address associated with the recipient account (block 660). For example, provider user device 210 and/or server device 220 may provide a notification to a recipient address based on the multimedia content message. Provider user device 210 and/or server device 220 may determine the recipient address based on recipient information obtained from recipient user device 210 and/or server device 220. In some implementations, provider user device 210 may provide the notification based on transmitting the multimedia content message to recipient user device 210 and/or server device 220. In some implementations, server device 220 may provide the notification based on receiving and/or storing the multimedia content message. In some implementations, provider user device 210 may deliver the notification to a device and/or system other than recipient user device 210. For example, the notification may be delivered to an email account identified by the recipient address, to a different user device 210 than recipient user device 210 based on the recipient address identifying the different user device 210, or the like.

The notification may indicate that a multimedia content message has been provided to the recipient account, and may include information related to the multimedia content message. For example, the notification may identify content of the multimedia content message, a particular user device 210 to which the multimedia content message has been delivered, a recipient account associated with the multimedia content message, a source of the multimedia content message, means for accessing the multimedia content message, or the like.

Recipient user device 210 may obtain the multimedia content message in association with and/or based on the notification, in some implementations. For example, provider user device 210 may provide the multimedia content message to server device 220, and provider user device 210 and/or server device 220 may provide a notification to recipient user device 210. Based on the notification, recipient user device 210 may obtain the multimedia content message from server device 220, and may provide the content to the user (e.g., via a user interface, by forwarding the multimedia content message to an email address associated with the recipient, etc.).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7K are diagrams of an example implementation 700 relating to example process 600 shown in FIG. 6. FIGS. 7A-7K show an example of providing a multimedia content message to a recipient user device. For the purpose of FIGS. 7A-7K, assume that the operations described in connection with FIGS. 5A-5E have been performed. That is, assume that server device 220 stores recipient information describing a recipient account associated with a recipient account name of User1, a password of 12345, a recipient address of 123-456-7890 that is associated with recipient user device 210, and content type preferences. For the purposes of FIGS. 7A-7K, assume that provider user device 210 places a voice call to recipient user device 210, and assume that recipient user device 210 does not answer the voice call.

Figure 7A:
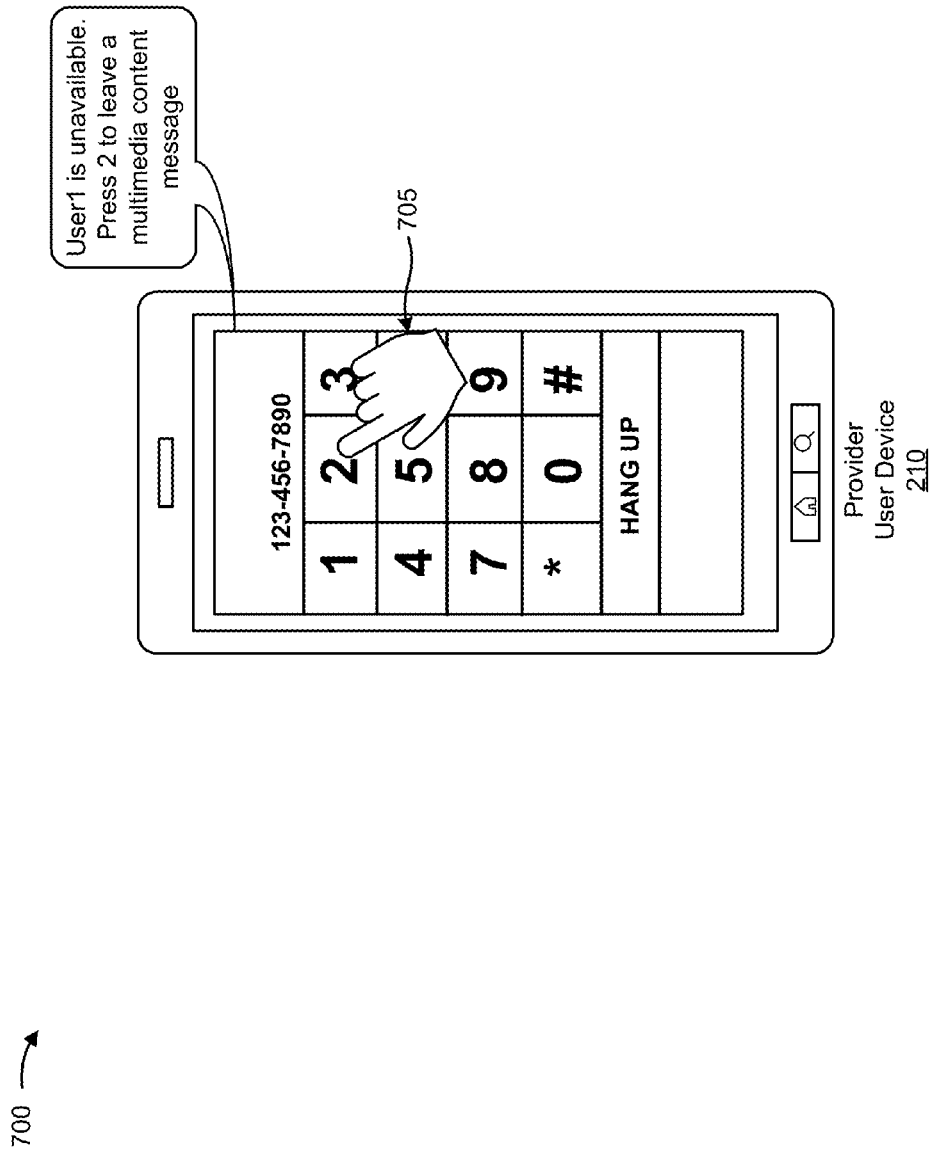

As shown in FIG. 7A, provider user device 210 may determine that recipient user device 210 does not answer the voice call. As shown, provider user device 210 may indicate, to a user of provider user device 210, that a user associated with recipient user device 210 is unavailable. As shown by reference number 705, provider user device 210 may receive an interaction with a user interface to cause provider user device 210 to provide a multimedia content message (e.g., an interaction with a "2" button of the user interface). Assume that provider user device 210 requests recipient information associated with the recipient address of 123-456-7890 from server device 220 based on the interaction to cause provider user device 210 to provide the multimedia content message.

Figure 7B:
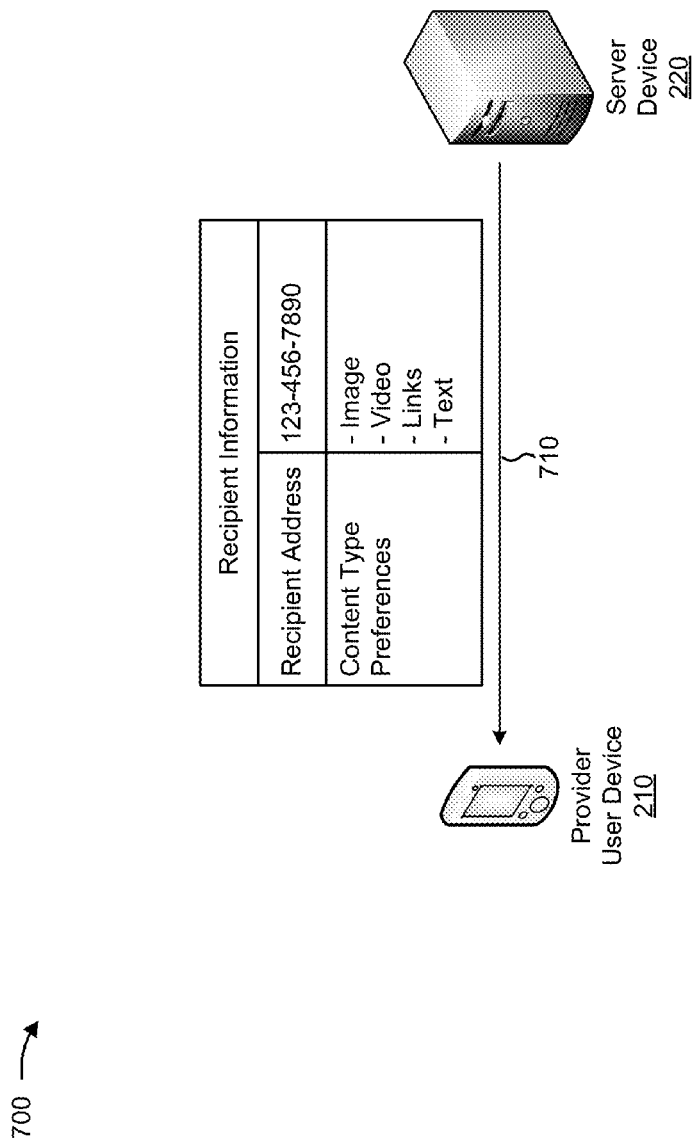

As shown in FIG. 7B, and by reference number 710, provider user device 210 may receive the recipient information from server device 220. As shown, the recipient information may include a recipient account name (e.g., Used), a recipient address (e.g., the phone number of 123-

456-7890, associated with recipient user device 210), and the content type preferences that indicate that recipient user device 210 permits image content, video content, links to webpages, and text content to be transmitted to recipient user device 210.

As shown in FIG. 7C, provider user device 210 may provide an interface to determine selected content types, of the content types identified by the content type preferences, to provide to recipient user device 210. As shown by reference number 715, assume that provider user device 210 receives interactions to select video content, links to webpages, image content, and text messages as the selected content types. As shown, provider user device 210 may receive an interaction to proceed to a next step of providing the multimedia content message.

As shown in FIG. 7D, provider user device 210 may obtain image content to include in the multimedia content message. As shown, provider user device 210 may permit a user to record an image using a camera associated with provider user device 210 (e.g., based on an interaction with a "Take Picture" button of a user interface). Here, provider user device 210 does not record an image using the camera. As shown by reference number 720, assume that provider user device 210 receives an interaction to select an image from a gallery of images. Assume that provider user device 210 stores information identifying the selected image. As shown, provider user device 210 may receive an interaction to proceed to a next step of providing the multimedia content message.

As shown in FIG. 7E, provider user device 210 may obtain a link to a webpage to include in the multimedia content message. Here, provider user device 210 obtains a uniform resource locator (URL) associated with the webpage. Assume that provider user device 210 obtains the URL based on user input to a user interface. As shown by reference number 725, provider user device 210 may receive a URL of "www.example.com/User1partypage". As further shown, provider user device 210 may permit a user to input additional URLs based on an interaction with an "Add another" button of the user interface. Here, provider user device 210 does not receive additional URLs. As shown, provider user device 210 may receive an interaction to proceed to a next step of providing the multimedia content message.

As shown in FIG. 7F, provider user device 210 may obtain video content to include in the multimedia content message. As shown by reference number 730, provider user device 210 may receive an interaction to record video content (e.g., using a camera component of provider user device 210). Assume that provider user device 210 records and stores video content to include in the multimedia content message. As further shown, provider user device 210 may permit a user to select a video from a gallery of stored videos. Here, provider user device 210 does not receive an interaction to select a video from the gallery of stored videos. As shown, provider user device 210 may receive an interaction to proceed to a next step of providing the multimedia content message.

As shown in FIG. 7G, provider user device 210 may obtain text content to include in the multimedia content message. As shown by reference number 735, provider user device 210 may provide a user interface to permit a user to input the text. Here, provider user device 210 receives text including "You should come to my party! RSVP at the link, please!" Assume that provider user device 210 stores the text. As shown, provider user device 210 may receive an interaction to proceed to a next step of providing the multimedia content message.

As shown in FIG. 7H, after obtaining the content, provider user device 210 may provide a list of content types included in the multimedia content message. As further shown, provider user device 210 may permit a user to provide additional content (e.g., based on an interaction with an "Add more content" button of a user interface). Here, provider user device 210 does not receive an interaction to permit the user to provide additional content. As shown by reference number 740, provider user device 210 may receive an interaction to cause provider user device 210 to provide the multimedia content message. As shown in FIG. 7I, and by reference number 745, provider user device 210 may provide an indication that the multimedia content message has been transmitted (e.g., "Your multimedia content message has been sent successfully!").

As shown in FIG. 7J, and by reference number 750, provider user device 210 may provide the multimedia content message, including the content, to server device 220. As further shown, provider user device 210 may provide, in association with the multimedia content message, information identifying the recipient account (e.g., the recipient account name of "User1"). Assume that server device 220 receives the multimedia content message and stores the multimedia content message in association with the recipient account of User1.

As shown by reference number 755, provider user device 210 may provide a notification to recipient user device 210 based on providing the multimedia content message to server device 220. Here, provider user device 210 provides a notification indicating that a multimedia content message is stored by server device 220.

As shown in FIG. 7K, and by reference number 760, recipient user device 210 may obtain the multimedia content message from server device 220 based on the notification. As shown, assume that recipient user device 210 provides a recipient account name (e.g., User1) and a credential (e.g., a password of 12345) associated with the recipient account. Assume that server device 220 authenticates recipient user device 210 based on the recipient account name and the credential. As shown by reference number 765, based on authenticating recipient user device 210, server device 220 may provide the multimedia content message, including the content, to recipient user device 210.

As indicated above, FIGS. 7A-7K are provided merely as an example. Other examples are possible and may differ from what was described with regard to FIGS. 7A-7K.

In this way, a recipient user device may specify particular content types to receive in a multimedia content message, which may conserve processor power and/or reduce network data congestion related to unwanted content types. A provider user device may provide a multimedia content message including content of some or all of the particular content types, which may simplify providing of different types of content, increase usage of features of user devices, and/or improve a user experience.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine to provide a multimedia content message, including content, to a user associated with a recipient account,
the user being associated with one or more user devices,
the one or more user devices being associated with the recipient account,
the recipient account being associated with a recipient address;
the multimedia content message including a list of multimedia content to be received,
the list being provided via a user interface of the device;
obtain content type preferences that are associated with the recipient account,
the content type preferences being selected by the user from a list of multimedia content types provided to the user of the one or more user devices associated with the user and reduce network congestion,
the list of multimedia content types related to multimedia content types to be included in a single message, and
the list of multimedia content types including at least two or more of:
images,
URLs,
payment information,
voicemails, or
text messages,
the content type preferences identifying one or more permitted content types that are permitted to be included in the multimedia content message from the list of multimedia content types,
the user interface being provided to obtain the content,
the user interface identifying the one or more selected content types, and
the user interface permitting specification of a particular order in which to provide the content in the multimedia content message, and
determine one or more selected content types, of the one or more permitted content types, to provide in the multimedia content message;
obtain the content, of the one or more selected content types, for providing in the multimedia content message; and
provide the multimedia content message including the content in the single message.

2. The device of claim 1, where the one or more processors, when determining the one or more selected content types, are further to:
determine the one or more selected content types based on receiving an interaction with the user interface provided by the device,
the one or more selected content types being selected from the one or more permitted content types.

3. The device of claim 1, where the one or more processors, when providing the content, are further to:
provide the content in the particular order to cause the one or more user devices to provide the content to the user in the particular order.

4. The device of claim 1, where the one or more processors, when providing the multimedia content message, are further to:
provide the multimedia content message to a server device for storage and providing to a recipient user device associated with the recipient address; and
provide a notification identifying the multimedia content message to the recipient address based on providing the multimedia content message to the server device.

5. The device of claim 1, where the one or more processors, when determining to provide the multimedia content message, are further to:
determine to provide the multimedia content message based on a communication with a first user device of the one or more user devices,
the first user device of the one or more user devices being associated with the recipient account, and
a second user device of the one or more user devices being associated with the recipient account,
the second user device being different than the first user device, and
the second user device being identified by the recipient address; and
where the one or more processors, when providing the multimedia content message, are further to:
provide the multimedia content message to the second user device based on the recipient address.

6. The device of claim 5, where the one or more processors, when determining to provide the multimedia content message, are further to:
determine to provide the multimedia content message based on an unanswered communication directed to the first user device.

7. A non-transitory computer-readable medium storing instructions, the instructions comprising:
one or more instructions that, when executed by one or more processors of a device, cause the one or more processors to:
determine to provide content to a user via a multimedia content message,
the multimedia content message including a list of multimedia content types to be received,
the list of multimedia content types being provided via a user interface,
the list of multimedia content types related to multimedia content types to be included in a single message,
the list of multimedia content types including at least two or more of:
images,
URLs,
payment information,
voicemails, or
text messages,
the user being associated with one or more user devices, and
the user being associated with a recipient account that is associated with the one or more user devices and that is associated with content type preferences; obtain the content type preferences,
the content type preferences being selected by the user from the list of types multimedia content provided to the user to improve operation of the one or more user devices associated with the user and reduce network congestion,
the content type preferences identifying one or more permitted content types,
a content type, of the one or more permitted content types, being a type of content that is permitted to be included in the multimedia content message,
determine one or more selected content types, of the one or more permitted content types, to include in the multimedia content message;
obtain content for the one or more selected content types,
the user interface being provided to obtain the content,
the user interface identifying the one or more selected content types, and
the user interface permitting specification of a particular order in which to provide the content in the multimedia content message; and
provide the multimedia content message, including the content, for providing to one or more of the one or more user devices associated with the recipient account.

8. The non-transitory computer-readable medium of claim 7, where the one or more instructions, that cause the one or more processors to provide the multimedia content message, further cause the one or more processors to:
provide a notification, to one of the one or more user devices, that identifies the multimedia content message.

9. The non-transitory computer-readable medium of claim 7, where the one or more instructions, that cause the one or more processors to obtain the content type preferences, further cause the one or more processors to:
obtain the content type preferences based on a communication with a user device of the one or more user devices,
the content type preferences being obtained based on a device identifier that identifies the user device,
the device identifier being associated with the recipient account.

10. The non-transitory computer-readable medium of claim 7, where the one or more instructions, that cause the one or more processors to obtain the content, further cause the one or more processors to:
obtain the content in the particular order based on at least one of an interaction with the user interface, a preference associated with the recipient account, or an order in which the content is received; and
where the one or more instructions, that cause the one or more processors to provide the multimedia content message, further cause the one or more processors to:
provide the content in the particular order.

11. The non-transitory computer-readable medium of claim 7, where the content includes at least one of:
audio content,
video content,
image content,
text content,
a document,
recorded voice content,
a link to a webpage,
digital payment information,
an executable file, or
a compressed file.

12. The non-transitory computer-readable medium of claim 7, where the one or more instructions, that cause the one or more processors to obtain the content type preferences, further cause the one or more processors to:

receive the content type preferences from a user device, of the one or more user devices, based on a communication transmitted to the user device,
the communication being unanswered by the user device.

13. The non-transitory computer-readable medium of claim 7, where the one or more instructions, that cause the one or more processors to determine the one or more selected content types, further cause the one or more processors to:
determine the one or more selected content types based on at least one of:
a speed of a connection of a user device, of the one or more user devices, to a network,
a location of the user device, or
a quality of a connection of the user device to a network.

14. A method, comprising:
determining, by a device, to provide content in a multimedia content message to a user,
the multimedia content message including a list of multimedia content types to be received,
the list of multimedia content types related to multimedia content types to be included in a single message, and
the list of multimedia content types including at least two or more of:
images,
URLs,
payment information,
voicemails, or
text messages,
the list being provided via a user interface,
the user being associated with a recipient account,
the recipient account being associated with content type preferences that identify a plurality of permitted content types,
each content type, of the plurality of permitted content types, identifying a type of content that is permitted to be included in the multimedia content message from a variety of content types;
obtaining, by the device, the content type preferences to determine the plurality of permitted content types,
the content type preferences being selected by the user from the list of multimedia content types provided to the user to improve operation of a user device associated with the user and reduce network congestion,
the user interface being provided to obtain the content,
the user interface identifying the one or more selected content types, and
the user interface permitting specification of a particular order in which to provide the content in the multimedia content message;
determining, by the device, one or more selected content types of the plurality of permitted content types,
the one or more selected content types being content types of content to be obtained by the device and included in the multimedia content message;
obtaining, by the device, content of the one or more selected content types; and
providing, by the device, the multimedia content message including the content.

15. The method of claim 14, where determining to provide the content further comprises:
determining to provide the multimedia content message based on a communication with the user device that is identified by a recipient address associated with the recipient account; and
where obtaining the content type preferences further comprises:
obtaining the content type preferences from the user device; and
where providing the multimedia content message further comprises:
providing the multimedia content message to the user device.

16. The method of claim 14, where providing the multimedia content message further comprises:
providing a notification to a recipient address associated with the recipient account,
the notification identifying the multimedia content message; and
providing the multimedia content message to a server device for storage and for retrieval by the user device associated with the recipient account.

17. The method of claim 14, where obtaining the content further comprises:
obtaining the content based on receiving one or more interactions with the user interface; and
where providing the multimedia content message further comprises:
providing the multimedia content message to the user device to cause the user device to provide the content to the user in the particular order.

18. The method of claim 14, where obtaining the content further comprises at least one of:
recording the content,
receiving the content based on an interaction with the user interface, or
obtaining the content based on receiving a link to the content.

19. The method of claim 14, where determining the one or more selected content types further comprises:
determining the one or more selected content types based on receiving an interaction with the user interface,
the user interface providing the plurality of permitted content types for display, and
the one or more selected content types being selected from the plurality of permitted content types.

20. The device of claim 1, where the one or more processors, when determining the one or more selected content types, are further to:
determine the one or more selected content types based on receiving an interaction with the user interface,
the user interface providing the plurality of permitted content types for display, and
the one or more selected content types being selected from the plurality of permitted content types.

* * * * *